United States Patent [19]

Fukushima et al.

[11] 3,891,570

[45] June 24, 1975

[54] PROCESS FOR PREPARING MICROCAPSULES

[75] Inventors: Mitsuru Fukushima; Yoshihito Inaba; Sadami Kobari; Masataka Morishita, all of Shizuoka, Japan

[73] Assignees: Toyo Jozo Co., Ltd.; Fuji Photo Film Co., Ltd., Japan

[22] Filed: Jan. 26, 1973

[21] Appl. No.: 326,844

[30] Foreign Application Priority Data
Jan. 26, 1972  Japan.............................. 47-10068

[52] U.S. Cl. .................. 252/316; 8/79; 117/100 A; 264/4; 424/32; 424/33; 424/35
[51] Int. Cl. .......................... B01j 13/02; B44d 1/02
[58] Field of Search................ 252/316; 117/100 A; 424/33, 35

[56] References Cited
UNITED STATES PATENTS

| | | | |
|---|---|---|---|
| 3,173,878 | 3/1965 | Reyes................... | 252/316 |
| 3,415,758 | 12/1968 | Powell et al. .......... | 252/316 |
| 3,516,942 | 6/1970 | Scarpelli................ | 252/316 |
| 3,523,906 | 8/1970 | Vrancken et al. ...... | 252/316 |
| 3,657,144 | 4/1972 | Yoshida................. | 252/316 |
| 3,664,963 | 5/1972 | Pasin.................... | 252/316 |

*Primary Examiner*—Richard D. Lovering
*Attorney, Agent, or Firm*—Craig & Antonelli

[57] ABSTRACT

Microcapsules are made by dissolving or dispersing a core substance in a solution of a wall material dissolved in a solvent having a dielectric constant of about 10 or less and poorly miscible with a polyhydric alcohol, then emulsifying in fine droplets this dispersion or solution into the polyhydric alcohol and finally removing the solvent through evaporation.

17 Claims, No Drawings

PROCESS FOR PREPARING MICROCAPSULES

This invention relates to a new process for preparing microcapsules.

It is well known that microcapsules can be prepared by an evaporating method in liquid vehicle. This method comprises dissolving a wall material in an organic solvent, dispersing a core substance into this solution, then emulsifying in fine droplets the thus prepared dispersion into a vehicle of water or an aqueous solution separately prepared to prepare a [W/O]/W type double emulsion and finally removing the organic solvent under heating or reduced pressure to produce microcapsules (see Japanese Pat. Publications No. 28744/64; No. 13703/67; No. 10863/68; No. 2757/70; and 9836/71). This method, however, has a drawback that no solvent miscible with water or with a boiling point higher than that of water can be used, since water or an aqueous solution is used as a vehicle. Furthermore, due to such restriction of solvents to be used as mentioned above, wall materials are also restricted to those soluble in these solvents.

The present inventors have already proposed to prepare microcapsules by using liquid paraffins or silicone oils as a vehicle and acetone or alcohols as a solvent. It has now been found that polyhydric alcohols can be used as a vehicle. It is also found that by the use of polyhydric alcohols as a vehicle, solvents other than acetone or alcohols, namely, solvents having a dielectric constant of about 10 or less can be used. It is further found that even solvents having a boiling point of 100°C or higher can be used. Moreover, it is also found that the use of these solvents makes polymers with qualities such as stomach solubility, intestine solubility or semipermeable membrane available as wall materials and also allows the use of core substances which may either be soluble or insoluble in the solvents, including water-soluble substances and aqueous solutions thereof.

An object of the present invention is, therefore, to provide a process for preparing microcapsules, wherein minute particles soluble or insoluble in the solvent employed or water-soluble minute particles or aqueous solutions thereof may be used as core substances.

Another object of the present invention is to provide a process for preparing microcapsules, wherein core substances unstable to heat may be used.

Still another object of the present invention is to provide a process for preparing microcapsules, wherein solvents with higher boiling points can also be used.

Furthermore, another object of the present invention is to provide a process for preparing microcapsules, wherein a stomach soluble polymer, an intestine soluble polymer or a semipermeable membrane polymer can widely be made avail of.

It is also another object of the present invention is to provide a process for preparing microcapsules, wherein a vehicle with a viscosity high enough to permit easy control of particle sizes of microcapsules to desired values may be used.

Further object of the present invention is to provide a process for preparing microcapsules, wherein polyhydric alcohols which are poor in miscibility with the solvents and reactivity with the core substances and inert in toxicity may be used as vehicles.

Further object of the present invention is to provide a process for preparing microcapsules, whereby microcapsules collected from vehicles may be rinsed quite easily with water, since the polyhydric alcohols used as vehicles are soluble in water.

Still further object of the present invention is to provide a process for preparing microcapsules, whereby enzymes can be made insoluble in water by the use of a semipermeable membrane polymer as a wall material.

Accordingly, the process for preparing microcapsules according to the present invention comprises preparing a dispersion or a solution of a wall material dissolved in a solvent having a dielectric constant of about 10 or less which is poorly miscible with the vehicle set forth below, subsequently emulsifying the thus prepared dispersion or solution in fine droplets into a vehicle of a polyhydric alcohol, and finally evaporating the solvent.

VEHICLE

The polyhydric alcohols herein used as vehicles refer to aliphatic dihydric or trihydric alcohols which are viscous fluid at normal temperature. The polyhydric alcohols suitable for the process of the present invention have a viscosity from 10 to 500 centipoises (at 25°C), preferably from 15 to 200. Representative examples are ethylene glycol, propylene glycol, 1,3-butylene glycol, 2,3-butylene glycol, hexylene glycol, pentanediol-2,4, hexanediol-2,5, heptanediol-2,4, 2-ethyl-1,3-hexanediol, diethylene glycol, dipropylene glycol, triethylene glycol, tripropylene glycol, glycerine, and the like. From an economical standpoint, ethylene glycol, propylene glycol and glycerine are preferably used. All of these polyhydric alcohols have high boiling temperatures. In order to adjust the viscosity of the polyhydric alcohols, water may be added to the polyhydric alcohols.

SOLVENT

The solvents which may be used in the present invention are good solvents for the wall materials as described below. They should have a dielectric constant of about 10 or less. Furthermore, they should be poorly miscible with the vehicle to be employed and have boiling temperatures lower than that of said vehicle. They may include methylene chloride, ethylene chloride, carbon tetrachloride, chloroform, diethyl ether, methyl ethyl ether, hexane, heptane, cyclohexane, petroleum ether, benzene, nitro methane, carbon disulfide, toluene, methyl acetate, ethyl acetate, butyl acetate, amyl acetate, methyl formate, ethyl formate, butyl formate, and the like. Suitable solvents may be selected according to the vehicle to be employed. For example, if ethylene glycol is used as a vehicle, solvents with boiling points up to 150°C may be used, while if glycerine is used as a vehicle, those with boiling points up to 240°C may be used. The wording "poorly miscible" means that the solvent is entirely immiscible or miscible in amounts not more than about 15 percent by volume with the vehicle.

WALL MATERIAL

The wall materials to be used in the present invention are high polymeric wall materials which are soluble in the solvents set forth above, and insoluble or poorly soluble in the vehicles. For example, there may be used ethyl cellulose, cellulose acetate, hydroxypropyl methyl cellulose phthalate, cellulose acetate dibutyl aminohydroxypropyl ether, polyvinyl butyral, polyvinyl formal, polystyrene, polyacrylic acid ester, polymethacrylic acid ester, polyvinyl acetal-diethylamino acetate, 2-methyl-5-vinyl pyridine methacrylate-methacrylic acid copolymer, polycarbonate, polyester, polypropylene, vinyl chloride-vinyl acetate copolymer, etc.

CORE SUBSTANCE

The core substances may either be solid or liquid. If solid, they may either be soluble or insoluble in the solvent employed. Any liquid core substance may be used, so long as it can be emulsified into the solvent. Examples of solid particles core substances soluble in the solvents as set forth above are aspirin, barbital, Josamycin, Kitasamycin, Diazepam, etc. Insoluble solid particles are, for example, enzyme particles, etc. Liquid core substances are exemplarily an aqueous esterase solution, an aqueous urease solution, an aqueous suspension of bacteria, and the like. Furthermore, materials from various fields, including drugs, enzymes, foods, agricultural medicines, fertilizers, perfumes, dyes, etc. may also be used as core substances.

PROCESS FOR PREPARING MICROCAPSULES

In the present invention, a wall material is first dissolved in a solvent together with or without a core substance. The concentration of a wall material in a solvent, which may vary according to the combination of the wall material and the solvent, may optionally be determined so that the viscosity of the solution may be within such a range as to permit emulsifying thereof in fine droplets in a vehicle. Said range is generally from about 2.5 to about 25 W/V percent. If the concentration is too high, wall films become thicker to produce hard microcapsules. The thickness of wall films is thinner as the concentration is lowered. If a wall material alone is dissolved in the above procedure, a core substance is dissolved or dispersed into the solution of the wall material. If the core substance is solid, it may be dissolved or suspended in the solution. In case of a liquid core substance, it may be dispersed and emulsified into the solution. Although the ratio of a wall material over a core substance may be optionally chosen, a ratio between 1/10 to 5 is suitable for easy encapsulation operations as well as for obtaining tough microcapsules.

Subsequently, the solution or suspension containing a wall material and a core substance is emulsified in fine droplets into a vehicle. The particle sizes may be controlled to from several microns to 1000 microns according to the object of various applications. The amount of a vehicle varies depending on the amount of the solvent employed. If it is too small, microcapsules are liable to adhere to each other to be conglomerated, while, if it is too much, collection of microcapsules becomes troublesome. Accordingly, an amount from about 4 to about 50 times the amount of the solution containing a wall material and a core substance is desirable. In the above emulsification, the vehicle may also contain surfactants and/or suspension powders. The surfactants may include anionic, cationic and nonionic surface active agents, e.g., sodium lauryl benzene sulfonic acid, Tween 20, Pluronic L 62, Tetronic 702, etc. As suspension powders, talc, magnesium stearate, aluminum stearate, kaolin, titanium dioxide, silicon dioxide, starch, D-mannitol, etc. may be mentioned.

In the step of emulsifying dispersion as mentioned above, fine droplets with various sizes may be obtained depending upon the amount of a solvent, the speed of stirring, the viscosity of a polymer, surfactants and suspension powders to be employed. Microcapsules uniform in size may be obtained by selecting suitable conditions as mentioned above. Generally, as the stirring speed is more rapid, the viscosity of a polymer or the amount of surfactants is more, microcapsules obtained become smaller in size.

Then, the above emulsion is stirred, heated or brought under reduced pressure to evaporate the solvent through the vehicle. In case the core substance is a fine particle soluble in the solvent, the wall material is first precipitated and envelops the core substance to form microcapsules. The microcapsules thereby formed may show a peculiar distribution of the polymer and the core substance with a specific concentration gradient due to the difference between the solubilities of the wall material and the core substance in the solvent. For example, if the wall material is higher in solubility that the core substance, the core substance becomes more concentrated at a portion nearer to the center of microcapsules while the wall material becomes richer at peripheral portions. This phenomenon may be ascribed to the transport of the polymer together with the solvent to the outer, which will occur as the solvent is evaporated. Accordingly, if the solubility of the core substance is similar to that of the wall material, both of them are homogeneously admixed with each other to make the wall film unable to be recognized. In case of a core substance suspended in a solvent, the cross section of the microcapsules obtained is like concrete. Furthermore, from a liquid core substance emulsified into a solvent, microcapsules are obtained which have a cross section like that of capsule clusters.

The microcapsules thus formed are then collected by separating them by means of filtration or centrifuge, admixing them well with a vehicle and washing them with a solvent which does not dissolve nor disintegrate microcapsules. Since the polyhydric alcohols used in the present invention are water soluble, they can easily be removed by washing with water. In addition, the solvent can be easily recovered and the drainage is water containing a small amount of non-toxic polyhydric alcohols. Therefore, the process of the present invention is free from the problem of pollution as distinguished from the processes of the prior art.

Since the wall films of microcapsules of the present invention can be made extremely thin, they may be provided with properties of semipermeable membrane. Hence, various applications, including production of insolubilized enzymes, may be expected of the microcapsules of the present invention.

The present invention will further be explained by referring to the following Examples, which should not be construed as limitations of the scope of the present invention.

EXAMPLE 1

One gram of ethyl cellulose (Product of Tokyo Kasei Co.) and one gram of aspirin are dissolved in 50 ml. of a mixed solvent of ethyl acetate-chloroform (1 : 1). This solution is emulsified in fine droplets into 150 ml of ethylene glycol (Product of Wako Jyunyaku Co.; the first grade) under stirring (400 r.p.m.). The stirring is continued for three hours at room temperature to produce durable microcapsules with sizes from 30 to 100

μ including aspirin. These microcapsules are then collected by centrifuge and rinsed with water. The microcapsules obtained are entirely free from pin holes or cracks on the film surfaces. Neither vacant ethyl cellulose balls nor balls filled with only ethyl cellulose are found, but all of the microcapsules are found to enclose aspirin.

EXAMPLE 2

Two grams of hydroxypropyl methyl cellulose phthalate (trade name: HP 55; product of Shinetsu Kagaku Co.) are dissolved in 30 ml of methylene chloride to prepare a solution, into which are dispersed two grams of Pancreatin with sizes from 50 to 100 μ. This solution is then emulsified in fine droplets in 150 ml. of the same ethylene glycol as used in Example 1 under stirring (400 r.p.m.). The stirring is continued for two hours at room temperature to evaporate the solvent and form capsules. The product thus obtained is rinsed with water to gave microcapsules containing Pancreatin with sizes from 500 to 1000 μ.

The microcapsules obtained are found to remain 95 percent proteolysis activity to prove that no deactivation occurs during the process of encapsulation. The disintegration test of the microcapsules is conducted according to the test method of the Japanese pharmacopeia (Eight Revision). According to this method, 2.0 g sodium chloride and 24.0 ml. dil. hydrochloric acid are made into 1000 ml. aqueous solution to prepare the first liquid (pH=1.2). Furthermore, 35.8 g. sodium hydrogen phosphate and 6.0 ml. dil. HCl are made into 1000 ml. aqueous solution to prepare the second liquid (pH=7.5). The enzyme, Pancreatin, loses activity in the first liquid as mentioned above. On the other hand, when the microcapsules are shaken for 30 minutes in the first liquid and further dissolved in the second liquid, the remaining activity measured according to Anthon-Knitz method amounts to as much as 85 percent.

EXAMPLE 3

One gram of polycarbonate (product of Teijin Kasei Co.) is dissolved in 20 ml. of methylene chloride to prepare a solution, into which is dispersed one gram of Retikinonase. This solution is emulsified in fine droplets in 150 ml. of the same ethylene glycol as used in Example 1 under stirring (400 r.p.m.) which is continued for two hours at room temperature. The product thus obtained is rinsed with water to give microcapsules containing Retikinonase with sizes from 100 to 300 μ.

EXAMPLE 4

0.5 Grams of vinyl chloride-vinyl acetate copolymer (product of Denki Kagaku Kogyo Co.) are dissolved in 20 ml. of methylene chloride. To this solution are added 200 mg. of esterase dissolved in 4 ml. of distilled water. The mixture is emulsified by means of a homogenizer (1000 r.p.m.). The emulsion is then emulsified in fine droplets into 150 ml. of glycerine (product of Jyunsei Kagaku Co.; the first grade) under stirring (4000 r.p.m.). The stirring is further continued for two hours at room temperature to form capsules. The product thus obtained is rinsed with water to obtain microcapsules containing esterase with sizes from 30 to 50 μ.

EXAMPLE 5

Two grams of leuco dyestuffs (trade name: color precursor-BC-11804, product of Allied Chemical Co.) dissolved in 50 ml. of cottonseed oil are dissolved in 200 ml. of methylene chloride dissolving two grams of the same polycarbonate as used in Example 3. This solution is emulsified under stirring into a mixture of 400 ml. of the same glycerine as used in Example 4 and 100 ml. of water. The stirring is continued for four hours at room temperature to form microcapsules with sizes from 10 to 50 μ. They are collected by filtration and thereafter rinsed with water.

EXAMPLE 6

Seven grams of Josamycin and three grams of polyvinyl acetol-diethylamino acetate (trade name: AEA, product of Sankyo Co.) are dissolved in 50 ml. of methylene chloride. This solution is then emulsified in fine droplets into 200 ml. of the same ethylene glycol as used in Example 1 under stirring (400 r.p.m.). The stirring is continued for three hours at room temperature to evaporate the solvent and form capsules. After washing with water, 9.5 grams of microcapsules with sizes from 40 to 100 μ are obtained.

EXAMPLE 7

Two grams of free base of Kitasamycin and three grams of the same polyvinyl acetal-diethylamino acetate as used in Example 6 are dissolved in 40 ml. of methylene chloride. Subsequently, this solution is emulsified in fine droplets into a mixture of 150 ml. of the same glycerine as used in Example 4 and 50 ml. of water under stirring (400 r.p.m.). The stirring is continued for four hours at room temperature to evaporate the solvent and form capsules. After washing with water, 4.5 grams of microcapsules with sizes from several microns to 50 μ are obtained. These microcapsules are extremely fine and with little bitter taste. Hence, they are suitable for syrups.

EXAMPLE 8

Two grams of Diazepam and one gram of the same ethyl cellulose as used in Example 1 are dissolved in 30 ml. of methylene chloride containing 0.5 g of talc. This solution is emulsified into 100 ml. of the same ethylene glycol as used in Example 1 under stirring (350 r.p.m.). The stirring is continued at room temperature to produce 3.2 g of microcapsules with sizes from 50 to 200 μ.

EXAMPLE 9

1.5 Grams of the same ethyl cellulose as used in Example 1 are dissolved in 25 ml. of methylene chloride. To this solution are added 2 ml. of a 50 percent aqueous glucose solution, 1 ml. of a buffer solution of phosphoric acid salts (0.4M;pH=7.5) and 3 ml. of suspension of 5 percent glucose isomerase producing bacteria (0.05 M, pH 7.5; buffer solution of phosphoric acid salts) and the mixture is emulsified by means of a homogenizer (1000 r.p.m.). Then, this emulsion is emulsified in fine droplets into 150 ml. of the same ethylene glycol as used in Example 1 under stirring (400 r.p.m.). The stirring is continued for three hours at room temperature to form capsules. After washing with water, insoluble enzymes with sizes from 50 to 200 μ are obtained.

By the use of these encapsulated insoluble enzymes, 0.8 M aqueous glucose solution is allowed to react as substrate at 60°C for 60 minutes. The amount of fructose produced is measured by cystinecarbazol method.

As the result, it is found that these insoluble enzymes exhibit 25 percent enzyme activity of the original enzymes added.

What we claim is:

1. A process for preparing microcapsules, which comprises preparing a dispersion or a solution of a core substance in a solution of a wall material dissolved in a solvent having a dielectric constant of about 10 or less, emulsifying the thus prepared dispersion or solution in the form of fine droplets within a liquid vehicle consisting essentially of a polyhydric alcohol which is poorly miscible with said solvent and evaporating the solvent from solution through said vehicle.

2. A process for preparing microcapsules according to claim 1 wherein the polyhydric alcohol is ethylene glycol, propylene glycol, 1,3-butylene glycol, 2,3-butylene glycol, hexylene glycol, pentanediol-2,4, hexanediol-2,5, heptanediol-2,4, 2-ethyl-1,3-hexanediol, diethylene glycol, dipropylene glycol, triethylene glycol, tripropylene glycol, or glycerine.

3. A process for preparing microcapsules according to claim 2, wherein the polyhydric alcohol is ethylene glycol, propylene glycol or glycerine.

4. A process for preparing microcapsules according to claim 1 wherein the solvent is methylene chloride, ethylene chloride, carbon tetrachloride, chloroform, diethyl ether, methyl ethyl ether, hexane, heptane, cyclohexane, petroleum ether, benzene, nitro methane, carbon disulfide, toluene, methyl acetate, ethyl acetate, butyl acetate, amyl acetate, methyl formate, ethyl formate, or butyl formate.

5. A process for preparing microcapsules according to claim 1 wherein the wall material is ethyl cellulose, cellulose acetate, hydroxypropyl methyl cellulose phthalate, cellulose acetate dibutyl aminohydroxypropyl ether, polyvinyl butyral, polyvinyl formal, polystyrene, polyacrylic acid ester, polymethacrylic acid ester, polyvinyl acetal-diethylamino acetate, 2-methyl-5-vinyl pyridine methacrylate-methacrylic acid copolymer, polycarbonate, polyester, polypropylene, or vinyl chloride-vinyl acetate copolymer.

6. A process for preparing microcapsules according to claim 1 wherein the sizes of the fine droplets are controlled to from several microns to 1000 microns.

7. A process for preparing microcapsules according to claim 1 wherein the ratio of the amount of the wall material over the core substance is from 1/5 to 10 based on the weight.

8. A process for preparing microcapsules according to claim 1 wherein an enzyme or an aqueous enzyme solution is used as a core substance.

9. A process for preparing microcapsules according to claim 7 wherein the concentration of the wall material in the solvent is from 2.5 to 25 W/V percent.

10. A process for preparing microcapsules according to claim 9 wherein the amount of the polyhydric alcohol is from 4 to 50 times the amount of the solvent based on volume.

11. A process for preparing microcapsules according to claim 1, wherein said polyhydric alcohol has a viscosity of from 10 to 500 centipoises at 25°C.

12. A process for preparing microcapsules according to claim 11, wherein said solvent has a boiling point less than the boiling point of said vehicle.

13. A process for preparing microcapsules according to claim 1, wherein said polyhydric alcohol has a viscosity of from 15 to 200 centipoises at 25°C.

14. A process for preparing microcapsules according to claim 1, wherein said vehicle consists of said polyhydric alcohol.

15. A process for preparing microcapsules according to claim 1, wherein said solvent is entirely immiscible or miscible in amounts not more than about 15 percent by volume with said vehicle.

16. A process for preparing microcapsules according to claim 1, wherein the wall material comprises a polymeric material soluble in said solvent.

17. A process for preparing microcapsules according to claim 1, further comprising separating the microcapsules from said liquid vehicle.

* * * * *